(12) United States Patent
Nordman

(10) Patent No.: US 11,338,899 B2
(45) Date of Patent: May 24, 2022

(54) JOINT FOR A METAL AIRPLANE SKIN USING METAL MATRIX COMPOSITE

(71) Applicant: THE BOEING COMPANY, Chicago, IL (US)

(72) Inventor: Paul S. Nordman, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 883 days.

(21) Appl. No.: 15/945,871

(22) Filed: Apr. 5, 2018

(65) Prior Publication Data
US 2019/0308716 A1 Oct. 10, 2019

(51) Int. Cl.
*B64C 1/12* (2006.01)
*B64C 1/06* (2006.01)
*B64C 1/00* (2006.01)

(52) U.S. Cl.
CPC .............. *B64C 1/12* (2013.01); *B64C 1/069* (2013.01); *B64C 2001/0081* (2013.01)

(58) Field of Classification Search
CPC ... B64C 1/12; B64C 1/069; B64C 2001/0081; B64C 3/26; B64F 5/10; B23K 2101/00–28; B23K 2103/16–172
See application file for complete search history.

(56) References Cited

U.S. PATENT DOCUMENTS

| | | | |
|---|---|---|---|
| 4,015,035 A | 3/1977 | Blad et al. | |
| 4,301,584 A * | 11/1981 | Dillner | B21D 26/053 29/889.71 |
| 4,411,380 A * | 10/1983 | McWithey | B32B 3/12 228/181 |
| 4,625,095 A * | 11/1986 | Das | B23K 35/0266 219/137 WM |
| 4,683,368 A * | 7/1987 | Das | B23K 35/0255 219/146.1 |
| 4,752,537 A * | 6/1988 | Das | B23K 35/0255 428/614 |
| 5,842,317 A | 12/1998 | Pettit | |

(Continued)

FOREIGN PATENT DOCUMENTS

| | | |
|---|---|---|
| DE | 102009048709 | 4/2011 |
| EP | 3034892 A1 | 6/2016 |

(Continued)

OTHER PUBLICATIONS

Extended European Search Report for EP Application No. 19162419.6 dated Aug. 16, 2019.

(Continued)

*Primary Examiner* — Philip J Bonzell
(74) *Attorney, Agent, or Firm* — Marshall, Gerstein & Borun LLP

(57) ABSTRACT

A joint for a metallic skin structure includes a first end portion of the metallic skin structure and a second end portion of the metallic skin structure, wherein the first end portion and the second end portion of the metallic skin structure are secured together along a line of securement. The joint further includes at least one reinforcing fiber embedded within at least one of the first end portion of the metallic skin structure or the second end portion of the metallic skin structure extends orthogonal relative to the line of securement.

20 Claims, 11 Drawing Sheets

(56) References Cited

U.S. PATENT DOCUMENTS

| | | | |
|---|---|---|---|
| 6,375,120 B1* | 4/2002 | Wolnek | B32B 5/28 |
| | | | 244/119 |
| 7,507,309 B2* | 3/2009 | Manicke | B23K 20/122 |
| | | | 156/73.5 |
| 7,879,454 B2* | 2/2011 | Manicke | B23K 20/122 |
| | | | 428/615 |
| 8,039,115 B2* | 10/2011 | Hackius | B23K 26/24 |
| | | | 428/615 |
| 2005/0112347 A1 | 5/2005 | Schmidt et al. | |
| 2008/0156846 A1* | 7/2008 | Manicke | B23K 20/129 |
| | | | 228/112.1 |
| 2009/0098406 A1* | 4/2009 | Manicke | B23K 20/122 |
| | | | 428/615 |
| 2009/0134275 A1* | 5/2009 | Hackius | B64C 1/12 |
| | | | 244/117 R |
| 2014/0268604 A1 | 9/2014 | Wicker et al. | |
| 2015/0291273 A1 | 10/2015 | Elze et al. | |
| 2016/0311051 A1* | 10/2016 | Nordman | B23K 20/2333 |

FOREIGN PATENT DOCUMENTS

| | | |
|---|---|---|
| EP | 3085616 A1 | 10/2016 |
| EP | 3170587 A2 | 5/2017 |
| JP | 2004155157 A | 6/2004 |

OTHER PUBLICATIONS

Notice of Reasons for Rejection for JP Application No. 2019-061233 dated Apr. 6, 2021.
Communication Pursuant to Article 94(3) EPC for EP Application No. 19162419.6 dated Jan. 17, 2022.

* cited by examiner

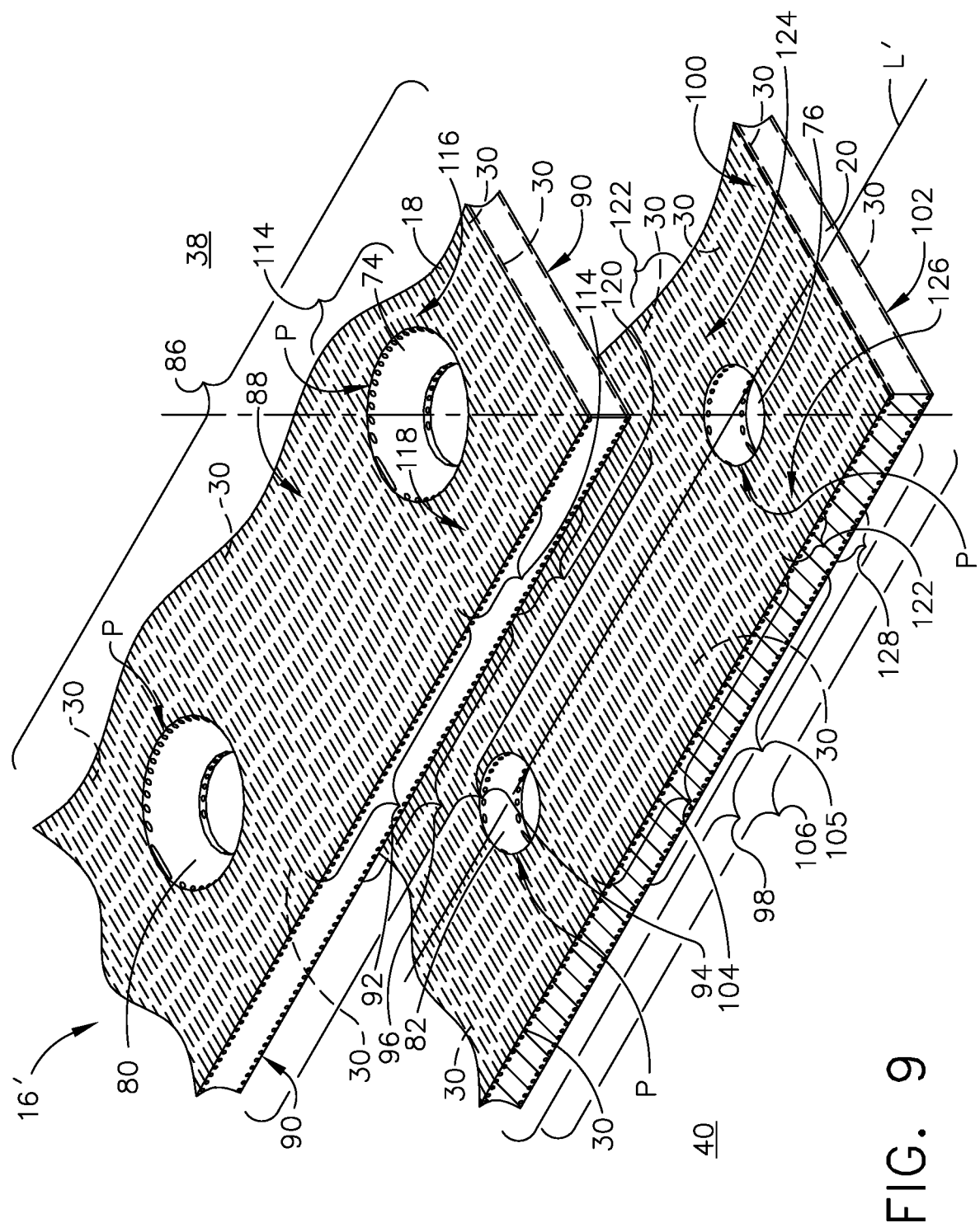

JOINT FOR A METAL AIRPLANE SKIN USING METAL MATRIX COMPOSITE

FIELD

This disclosure relates to an airplane having a metallic skin structure and more particularly to strategically reinforcing a joint in the metallic skin structure to reduce migration of fatigue cracking in the metallic skin structure.

BACKGROUND

Aircraft constructed of a metal skin have joints in the metallic skin structure such as lap joints which have overlapping portions of the metallic skin structure connected together with fasteners such as rivets. Fatigue cracking at the fastener head location in the lap joint can occur as a result of the operation of the aircraft such as for example occurring in a fuselage metallic skin structure in response to tensile stress from hoop tension load experienced at a head location of the fastener. This can result in cracking within the metallic skin structure in a direction along the line of securement of a row of fasteners such as rivets.

Fatigue cracking can also occur as a result of errors introduced in the process of fabricating the lap joint causing cracks to extend between fastener securements in the metallic skin structure. The fatigue cracks can originate in the metallic skin structure as a result of fastener counter sinks which have been placed too deep and from double drilled holes both of which can reduce fatigue life of the lap joint.

Current lap joints splice constructions provide reliable construction connections such as with using three or four rows of connections within the lap joint. Utilizing four rows of connections has improved the lap joint performance. However this construction does not eliminate the sensitivity to manufacturing errors which can introduce fatigue cracking within the metallic skin structure. There is a need when fatigue cracking occurs in this joint to reinforce the metallic skin structure so as to mitigate fatigue crack progression within the metallic skin structure.

Another example of a joint within a metallic skin structure includes use of a weld to secure together ends of portions of the metallic skin structure. Generally the weld is weaker than the metallic skin structure. However, in the process of welding the metallic skin structure weakens adjacent to the weld in what is referred to as the heat affected zone. The metallic skin structure positioned within the heat affected zone is a likely area in which fatigue cracking will occur within the metallic skin structure. As a result there is a need when fatigue cracking occurs in this joint to reinforce the metallic skin structure so as to mitigate fatigue crack progression within the metallic skin structure.

Even though fatigue cracking can be expected within the metallic skin structure with the metallic skin structure being safe to operate there is a need to mitigate the progression of the fatigue cracking so as to provide an enhanced margin of safety with respect to the metallic skin structure. This is the case regardless of whether the cracking within the metallic skin structure at a joint in a metallic skin structure was introduced by operation of the aircraft or by way of an error in the manufacturing process or otherwise. The mitigation is needed to prevent the cracking from progressing, for example, to an adjacent fastener opening in the case of a lap joint resulting and making lap joints less sensitive to manufacturing errors. There is also a need to mitigate the progression of any fatigue cracking within the metallic skin structure along a weld joining two ends of different portions of metallic skin structure in furtherance of enhancing the margin of safety of this joint as well. In the effort of mitigating the progression of fatigue cracking it would be beneficial to avoid unnecessary increases in the weight of the aircraft. Such mitigation should provide for increased structural fatigue life of the joint and provide for a reduction of structural inspections, all of which would save costs in operation and maintenance of the aircraft.

SUMMARY

An example includes a joint for a metallic skin structure includes a first end portion of the metallic skin structure and a second end portion of the metallic skin structure, wherein the first end portion and the second end portion of the metallic skin structure are secured together along a line of securement. The joint further includes at least one of a reinforcing fiber embedded within at least one of the first end portion of the metallic skin structure or the second end portion of the metallic skin structure extends orthogonal relative to the line of securement.

An example includes a method for fabricating a joint for a metallic skin structure, which includes the steps of securing a first end portion of the metallic skin structure to a second end portion of the metallic skin structure along a line of securement. The method further includes positioning at least one reinforcing fiber embedded within at least one of the first end portion or the second end portion, wherein the at least one reinforcing fiber extends orthogonal relative to the line of securement.

The features, functions, and advantages that have been discussed can be achieved independently in various embodiments or may be combined in yet other embodiments further details of which can be seen with reference to the following description and drawings.

BRIEF SUMMARY OF THE DRAWINGS

FIG. 9 is an enlarged view of what is encircled and designated 9 in FIG. 6 showing reinforcing fibers positioned within the first and second end portions of the metallic skin structure.

DESCRIPTION

Figure 1:
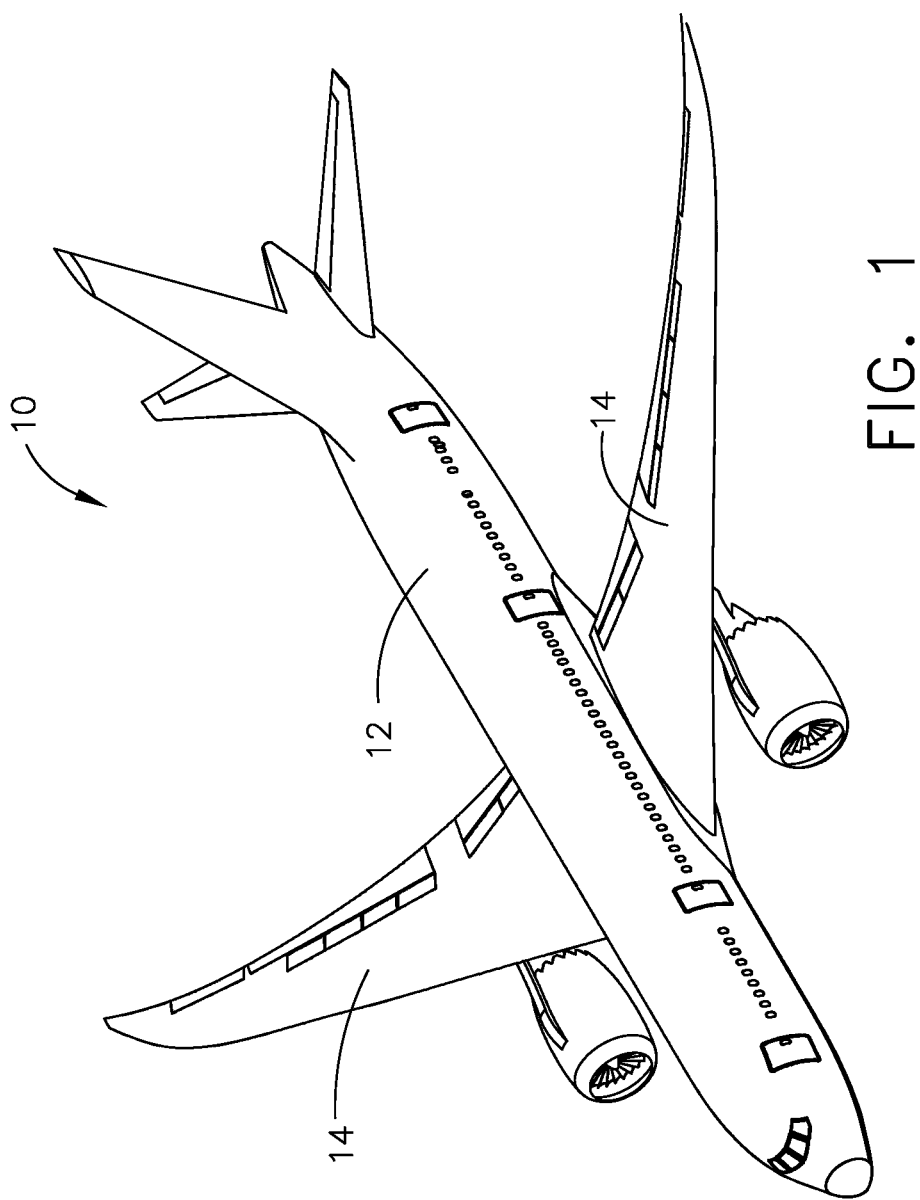
FIG. 1 is a perspective view of an aircraft utilizing a metallic skin structure.
Figure 2A:
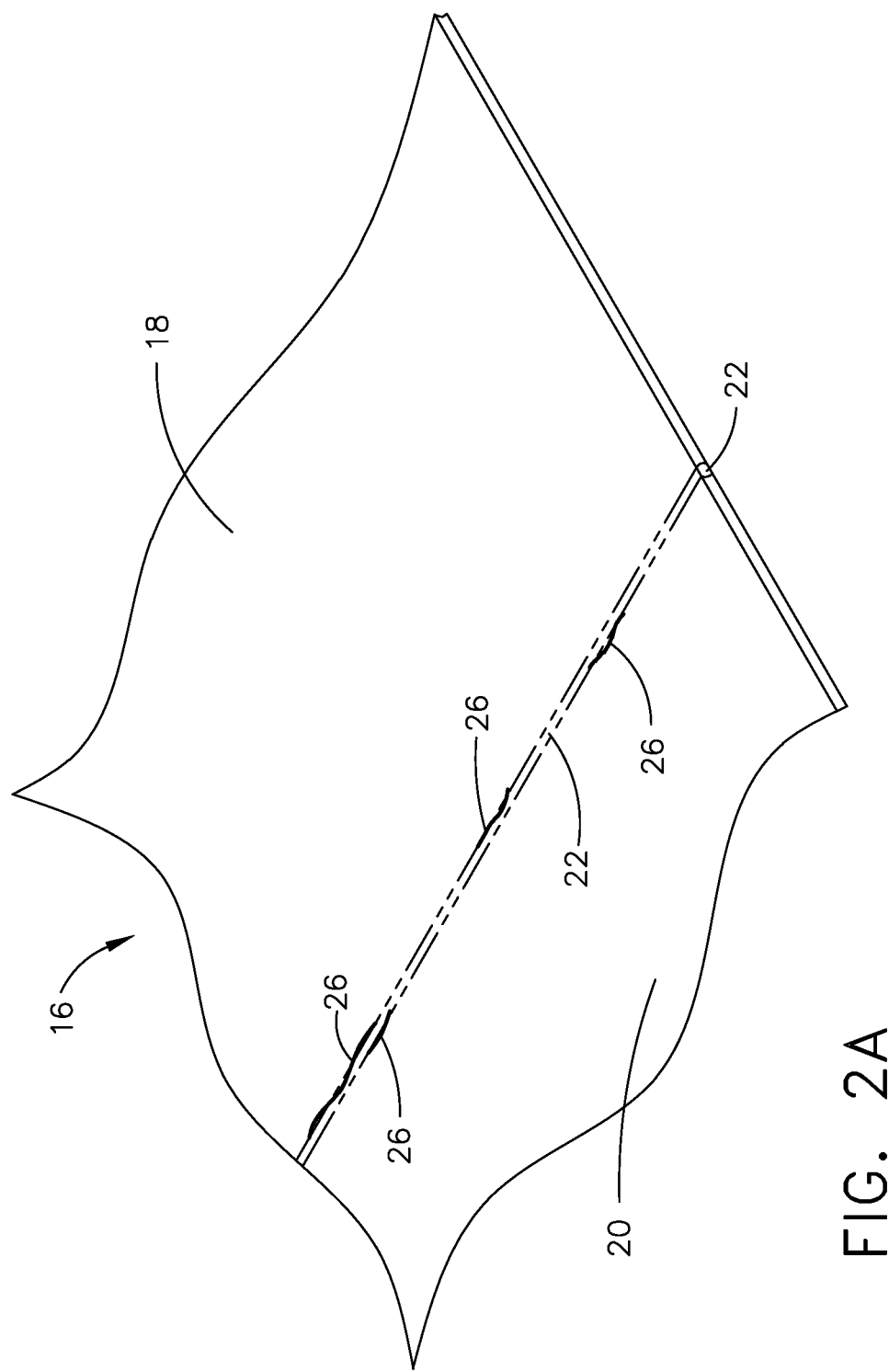
FIG. 2A is a partial perspective view of a first example of a joint for a metallic skin structure which includes a weld joining a first end portion and a second end portion of the metallic skin structure of the aircraft in FIG. 1, with fatigue cracks positioned within the metallic skin structure.
Figure 2B:
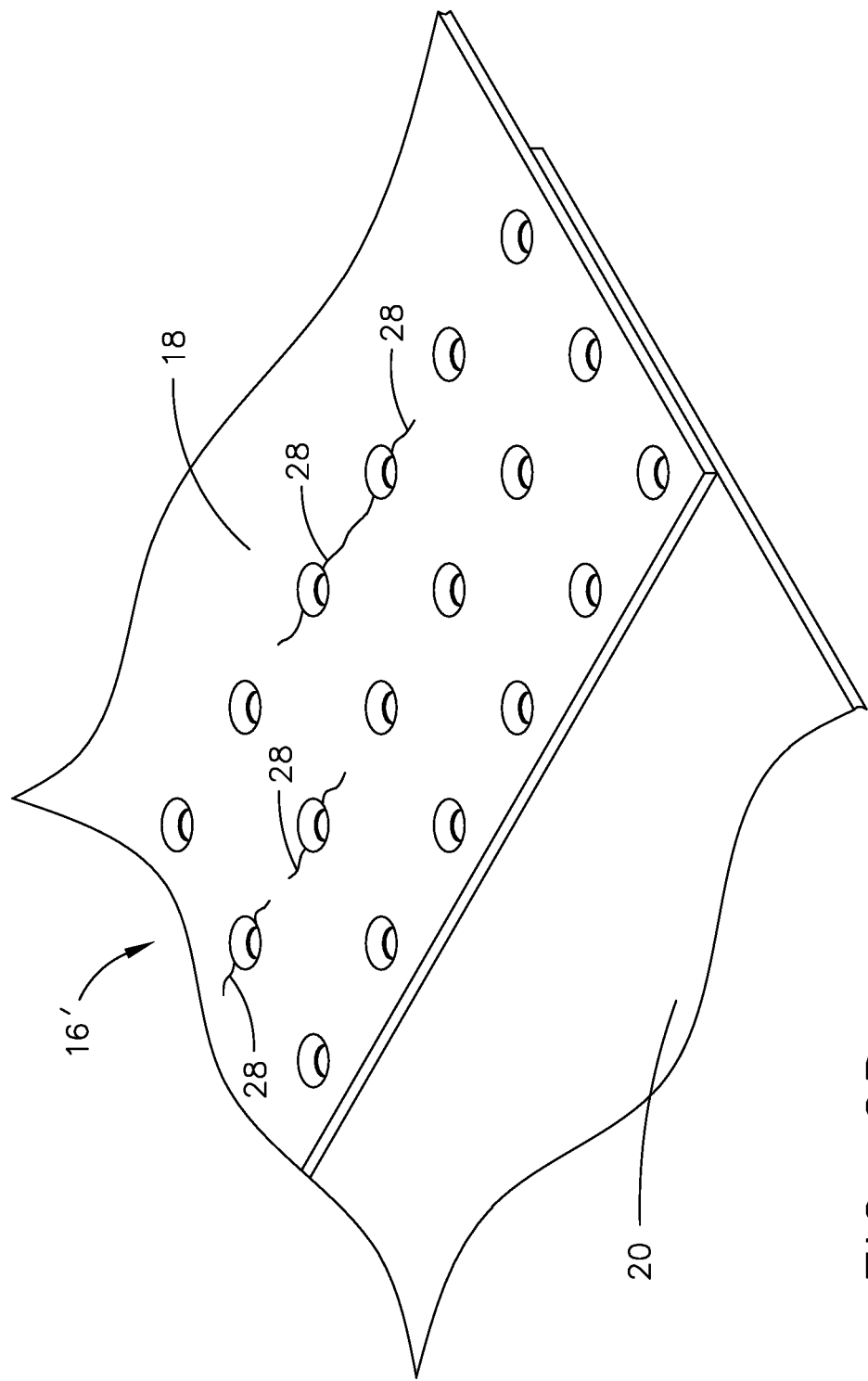
FIG. 2B is a partial perspective view of a second example of a joint for a metallic skin structure which includes an overlap of a first end portion and a second end portion of a metallic skin structure of the aircraft in FIG. 1 with rows of aligned bores which extend through the first and second end portions for positioning fasteners there through (not shown) for securement and fatigue cracks positioned within the metallic skin structure.

As mentioned earlier, aircraft 10 as seen in FIG. 1, has a metallic skin structure, which is constructed of aluminum or other known metal(s) used in fabricating aircraft 10, such as for fuselage 12, wings 14 as well as other locations in aircraft 10. Metallic skin structure have end portions of the metallic skin structure which are secured together at a joint which can have different construction configurations. These joints can include, for example, joint 16, as seen in FIG. 2A, which joins together first end portion 18 of metallic skin structure and second end portion 20 of metallic skin structure, wherein first end portion 18 and second end portion 20 are secured or coupled together with weld 22. Another joint 16' is shown in FIG. 2B wherein first end portion 18 is positioned in overlying relationship to second end portion 20 forming an overlap and first and second end portions 18, 20 are joined or secured together along with rows of fasteners (not shown) which are positioned within the rows of bores shown in FIG. 2B. Fasteners (not shown) in FIG. 2B can be, for example, rivets 24 as shown for example in FIGS. 8A, 8B.

Fatigue cracks 26, as shown in FIG. 2A, are positioned in first and second end portions 18, 20 of metallic skin structure on either side of weld 22. As mentioned earlier, fatigue cracks can occur within the metallic skin structure positioned within the heat affected zone adjacent to weld 22 wherein for example tensile force experienced in joint 16 can commence fatigue cracks, such as fatigue cracks 26, and cause them to propagate within the metallic skin material of first and second end portions 18, 20 along a line of securement of joint 16, along weld 22, which will be discussed in more detail herein.

In overlap joint 16', as seen in FIG. 2B, one or both of first and second end portions 18, 20 are positioned in overlying relationship to one another can experience fatigue cracks 28 which extend from one or more bores which receive fasteners for securing or coupling the first and second end portions 18, 20 together. Fatigue cracks 28 occur for one or more reasons earlier discussed which include tensile forces exerted on joint 16' from operation of aircraft 10 and as a result of errors introduced in the process of fabricating joint 16'. Manufacturing errors may be introduced during the fabrication process such as with fastener counter sinks which have been placed too deep and such as with double drilled holes which both contribute to reduced fatigue life at overlap joint 16'. Fatigue cracks 28, as seen in FIG. 2B, occur in the metallic skin structure and extend along a line of securement such as a row of fasteners which will be discussed in more detail herein.

Current overlap joint 16' splice constructions provide reliable construction connections. The use of four rows of fasteners, as mentioned earlier, in lap joint 16' has improved lap joint 16' performance. However this construction and securement has not eliminated the sensitivity to manufacturing errors which can introduce cracking within the metallic skin structure wherein those cracks within the metallic skin structure can extend and progress within the metallic skin structure.

As mentioned earlier, joints 16 and 16' are designed for safe operation however there is a need to enhance the margin of safety for metallic skin structures with the mitigation of the extension and progression of any fatigue cracking within the metallic skin structures at a joint 16 which has been welded or in the case of lap joint 16' which has been for example riveted together. The mitigation would provide for increased structural fatigue life and provide for a reduction of structural inspections. As mentioned earlier, there is also a need to avoid experiencing unnecessary increases in the weight of the aircraft in mitigating crack extension and progression.

Figure 3:
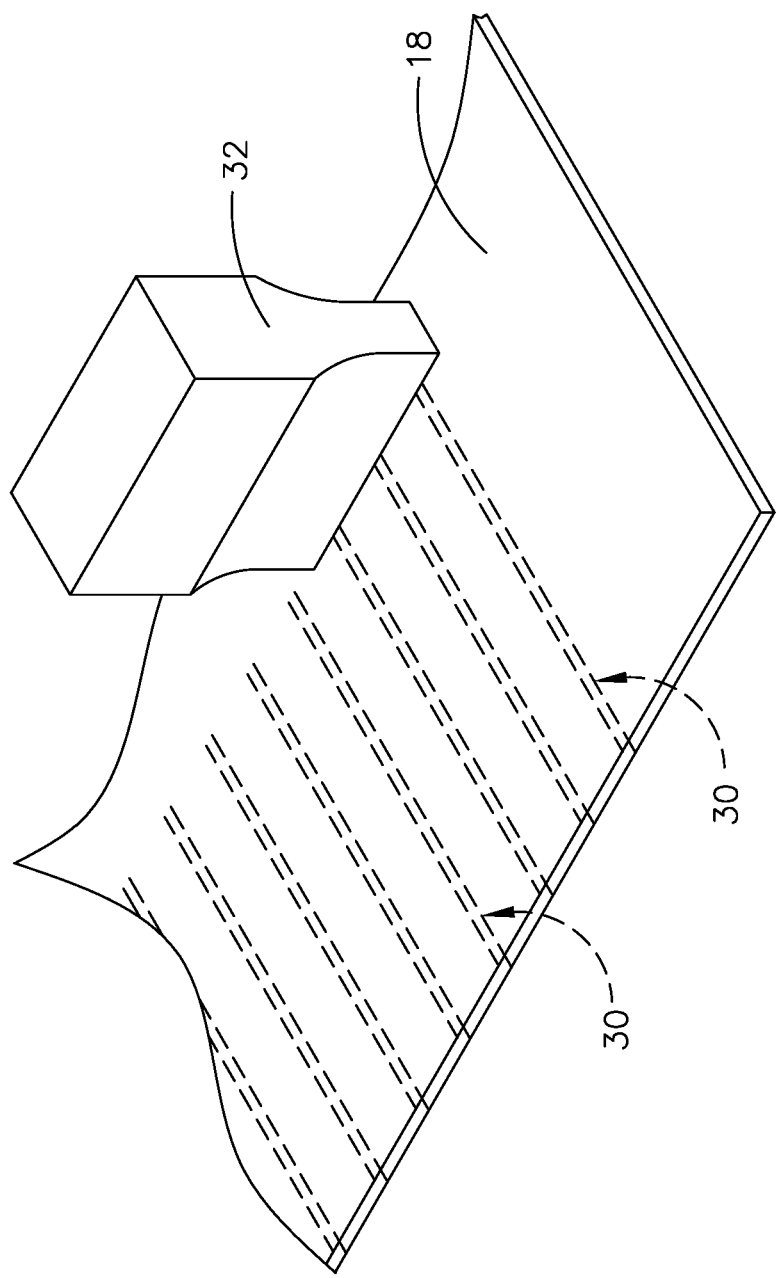
FIG. 3 is a partial perspective view of embedding reinforcing fibers with an ultrasonic horn into metallic skin structure used in constructing a joint for the metallic skin structure of the aircraft of FIG. 1.
Figure 4:
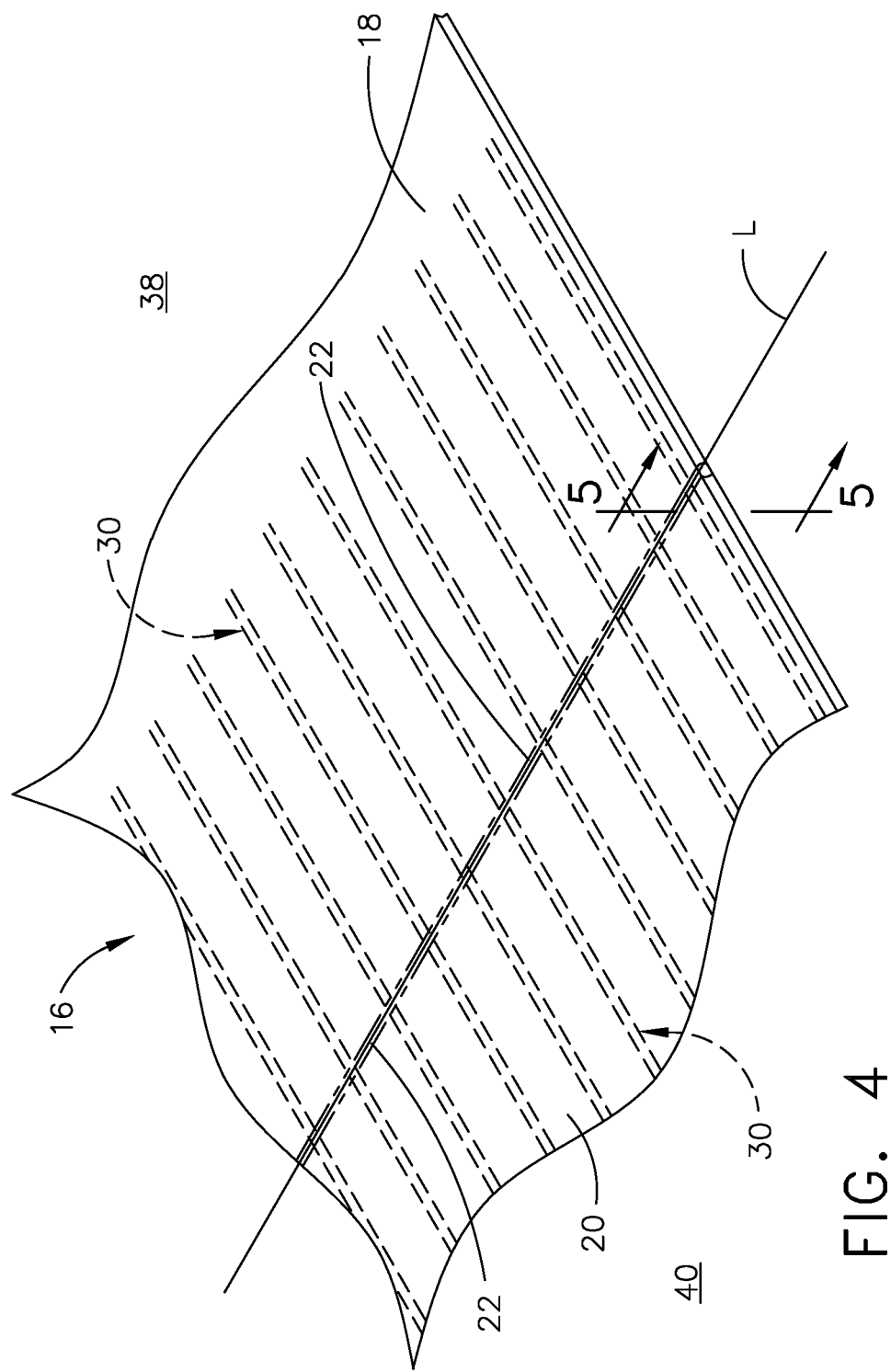
FIG. 4 is a partial perspective view of the first example of the metallic skin structure joint of FIG. 2A, showing metallic fibers having been embedded into first end portion of the metallic skin structure, the weld and the second end portion of the metallic skin structure.
Figure 5:
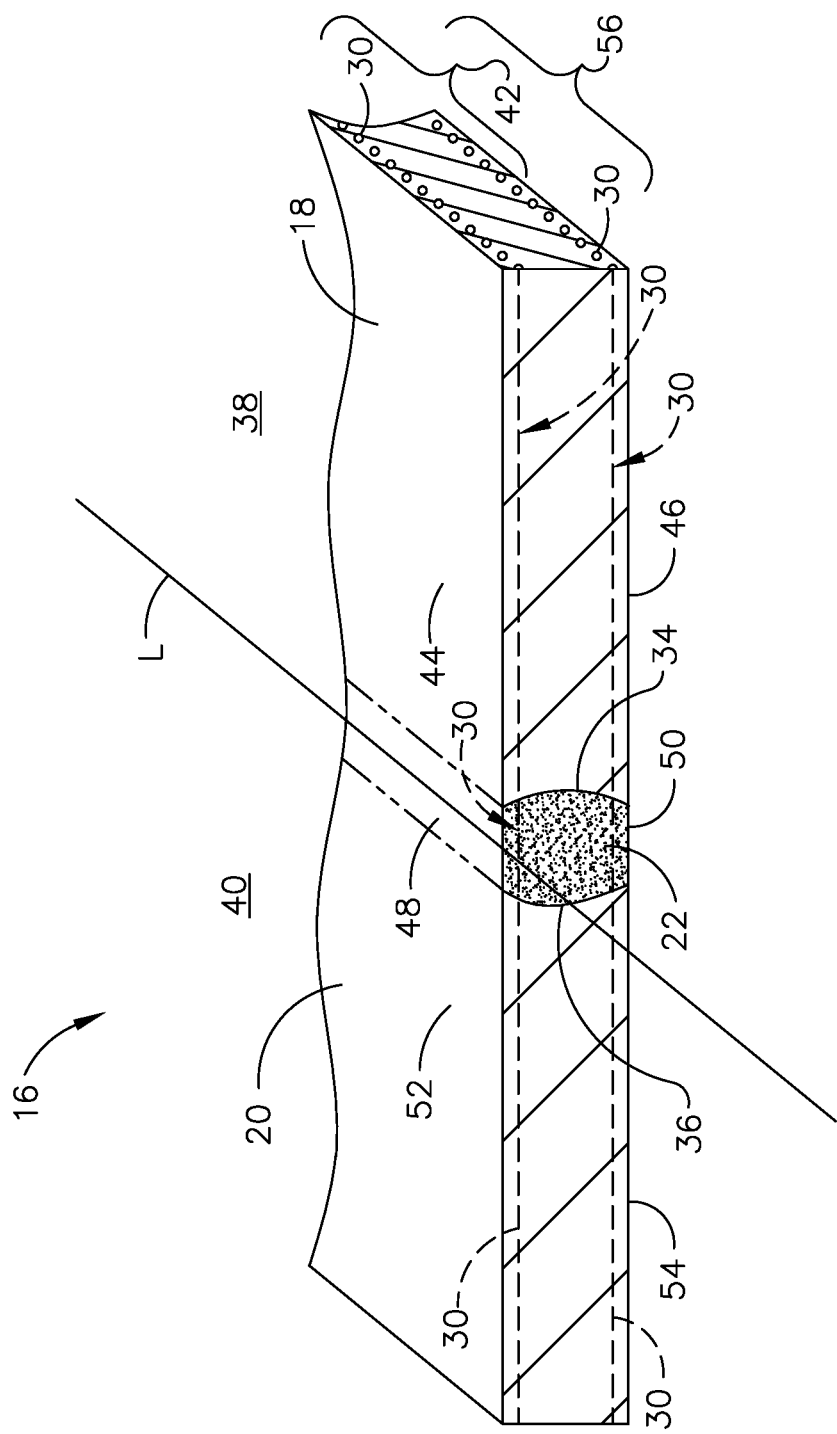
FIG. 5 is a partial perspective view of the cross section taken along line 5-5 as seen in FIG. 4.

As seen in FIG. 3, reinforcing fibers 30 are shown being embedded into first end portion 18 of metallic skin structure which will similarly be embedded into second end portion 20 (not shown) in constructing joint 16 and lap joint 16'. Reinforcing fibers 30 can be constructed of metallic or nonmetallic material and are made from very strong materials which are stronger than the aluminum or similar metals from which the metallic skin structure is constructed. Some materials selected for use for reinforcing fibers 30 include aramid, ceramic or silicon carbide fibers and other such strong materials. As will be discussed in more detail herein, reinforcing fibers 30 will be embedded within first and second end portions 18, 20, and weld 22 for joint 16 as seen in FIGS. 4 and 5 and will be embedded within first and second end portions 18, 20 for lap joint 16' as seen in FIGS. 6-9. The embedding of reinforcing fibers 30, as will be discussed, strengthen the joint and will inhibit growth of fatigue cracks 26 and 28 within the metallic skin structure.

Reinforcing fibers 30, in this example, can be used in a range of diameters including fifty ten thousandths of an inch to up to and including sixty ten thousandths of an inch (0.0050-0.0060 inches). Reinforcing fibers 30 are embedded into the metallic skin structure at a depth distance from the surface of first and second end portions 18, 20 and weld 22 of at least one thousandth of an inch (0.001 inch). The embedding is accomplished in this example with using an ultrasonic horn 32. Ultrasonic horn 32 is pressed against reinforcement fiber 30 and the metallic skin structure and the vibrations from ultrasonic horn 32 press reinforcing fiber 30 into the metallic skin structure. This embedding process is employed, in this example, at a temperature of approximately three hundred degrees Fahrenheit (300° F.).

A first example of joint 16 is shown in FIGS. 4 and 5 wherein joint 16 includes first end portion 18 of metallic skin structure of aircraft 10 and second end portion 20 of metallic skin structure of aircraft 10. First and second end portions 18, 20 are secured together along a line of securement L, in this example, with weld 22. Additionally, joint 16 includes at least one reinforcing fiber 30 embedded within at least one of the first end portion 18 or the second end portion 20 and extends orthogonal to the line of securement L. The arrangement of reinforcing fibers 30 will be discussed below in further detail for first example of joint 16.

As seen in FIG. 5, first end portion 18 includes first end 34 and second end portion 20 includes second end 36. First and second ends 34, 36 are positioned aligned and facing each other. First end 34 and second end 36 are secured or coupled together with weld 22 positioned between first end 34 and second end 36. Weld 22 can be any one of a variety of welds such as a conventional weld, a friction stir weld or other commonly known welds. Weld 22 extends along first end 34 and second end 36. Weld 22, as seen in FIG. 5, defines line of securement L.

At least one reinforcing fiber 30 is embedded within first end portion 18 positioned on first side 38 of line of securement L. At least one reinforcing fiber 30 extends from first end portion 18 and into and embedded within weld 22. At least one reinforcing fiber 30 extends from weld 22 into and embedded within second end portion 20 of the metallic skin structure positioned on an opposing second side 40 of line of securement L.

In referring to FIG. 5, the at least one reinforcing fiber 30 includes a first plurality 42 of reinforcing fibers 30 wherein adjacent reinforcing fibers 30 within first plurality 42 of reinforcing fibers 30 extend spaced apart from one another. The first plurality 42 of reinforcing fibers 30 are embedded within the first end portion 18 on first side 38 of line of securement L and extend through first end portion 18 positioned closer to first surface 44 of first end portion 18 than to opposing second surface 46 of first end portion 18. First plurality 42 of reinforcing fibers 30 extend from first end portion 18 and into and embedded within weld 22 positioned closer to first surface 48 of weld 22 than to opposing second surface 50 of weld 22. The first plurality 42 of reinforcing fibers 30 extend from weld 22 into and embedded within second end portion 20 on opposing second side 40 of line of securement L embedded within second end portion 20 positioned closer to first surface 52 of second end portion 20 than to opposing second surface 54 of second end portion 20.

In further referring to FIG. 5, second plurality 56 of reinforcing fibers 30 wherein adjacent reinforcing fibers 30 within second plurality 56 of reinforcing fibers 30 extend spaced apart from one another. The second plurality 56 of reinforcing fibers 30 are embedded within first end portion 18 on first side 38 of line of securement L and extend through first end portion 18 positioned closer to opposing second surface 46 of first end portion 18 than to first surface 44 of first end portion 18. Second plurality 56 of reinforcing fibers 30 extend from first end portion 18 into and embedded within weld 22 positioned closer to opposing second surface 50 of weld 22 than to first surface 48 of weld 22. The second plurality 56 of reinforcing fibers 30 extend from weld 22 into and embedded within second end portion 20 on opposing second side 40 of line of securement L embedded within second end portion 20 positioned closer to opposing second surface 54 of the metallic skin structure than to first surface 52 of second end portion 20 of the metallic skin structure.

As mentioned earlier diameters of reinforcing fibers 30 are in a range of fifty ten thousandths of an inch to and sixty ten thousandths of an inch (0.0050-0.0060 inches). Reinforcing fibers 30 can be constructed from one of a number of materials such as aramid, ceramic or silicon carbide fibers which are stronger than the aluminum or similar metals used in the construction of metallic skin structures. Reinforcing fibers in this example are embedded within first end portion 18, second end portion 20 and weld 22 a depth of at least one thousandth of an inch (0.001 inch).

Figure 6:
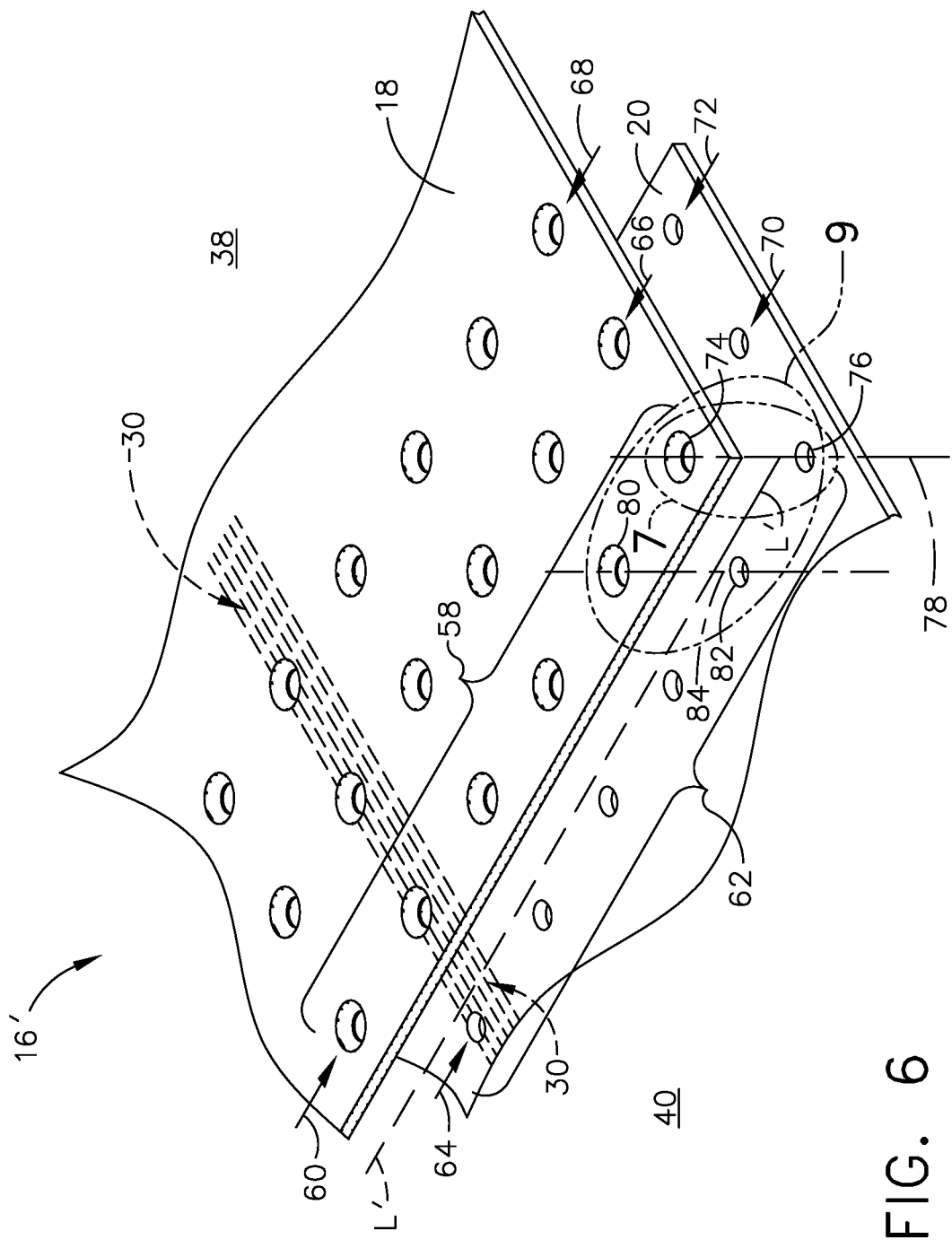
FIG. 6 is an exploded view of the second example of the overlap joint of FIG. 2B additionally with representative reinforcing fibers shown which have been embedded in the first end and second end portions of the metallic skin structure.

In referring to FIGS. 6-9, second example of joint 16' metallic skin structure is shown. First end portion 18 and second end portion 20 are positioned in an overlying relationship with one another and are secured together along a line of securement L'. First and second end portions 18, 20 are secured together along a line of securement L', in this example, with rows of fasteners (fasteners not shown in FIG. 6) that extend through bores which extend through both first and second end portions 18, 20. Additionally, joint 16' includes at least one reinforcing fiber 30, examples of some of reinforcing fibers 30 are shown in FIG. 6, embedded within at least one of first end portion 18 or second end portion 20 and extends orthogonal relative to line of securement L'.

In referring to FIG. 6, another or overlap joint 16' of the metallic skin structure includes first end portion 18 and second end portion 20 positioned, as mentioned above, in overlying relationship with one another. First plurality of bores 58 is positioned in first row 60 within first end portion 18 with adjacent bores in the first plurality of bores 58 spaced apart. Second plurality of bores 62 is positioned in second row 64 within second end portion 20 with adjacent bores in second plurality of bores 62 spaced apart. First row 60 of first plurality of bores 58 align with second row 64 of second plurality of bores 62. This arrangement is similarly reproduced for the other rows 66, 68 of bores shown in first end portion 18 and rows 70, 72 (not completely shown) in second end portion 20.

Figure 8A:
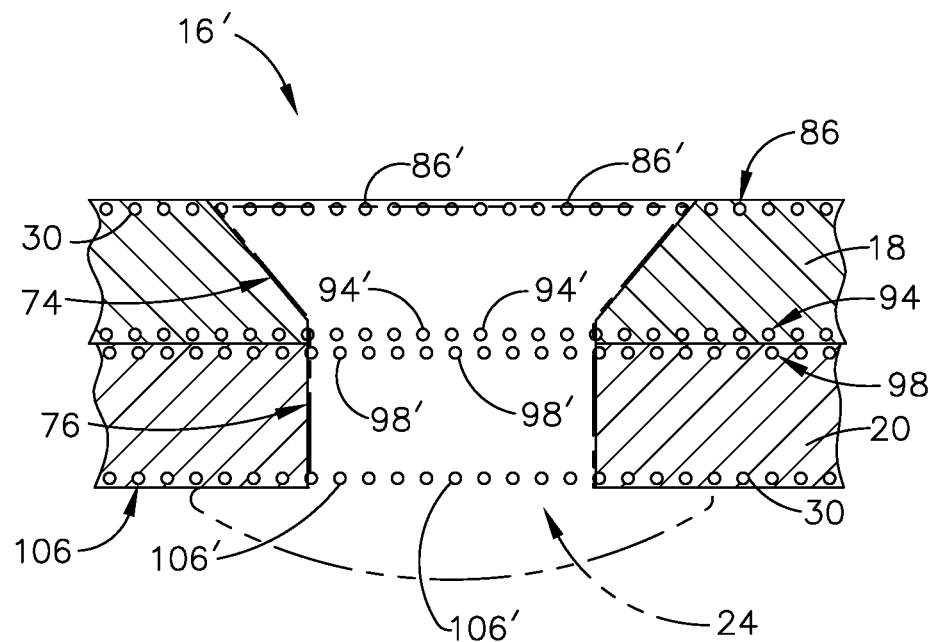
FIG. 8A is a cross section view taken along line 8A-8A in FIG. 7 with a representative fastener positioned extending through a first bore of first plurality of bores positioned in the first end portion of the metallic skin structure and a first bore of the second plurality of bores positioned in the second end portion of the metallic skin structure.
Figure 8B:
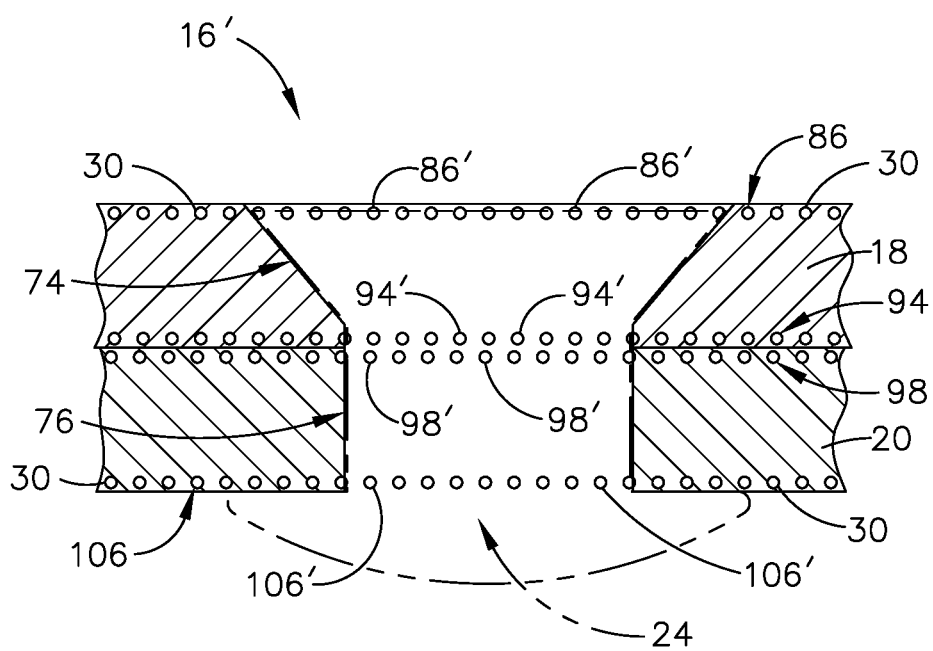
FIG. 8B is a cross section view taken along line 8B-8B in FIG. 7 with a representative fastener positioned extending through the first bore of the first plurality of bores in the first end portion of the metallic skin structure and the first bore of the second plurality of bores in the second end portion of the metallic skin structure.

In referring to FIG. 6, first bore 74 in first plurality of bores 58 is aligned with first bore 76 of second plurality of bores 62 such that first bore 74 of first plurality of bores 58 and first bore 76 of second plurality of bores 62 have a first common central axis 78 such that first fastener or rivet 24 may, as seen in FIGS. 8A and 8B, extend through first bore 74 of first plurality of bores 58 and through first bore 76 of second plurality of bores 62. Second bore 80 adjacent to first bore 74 of first plurality of bores 58 is aligned with second bore 82 adjacent to the first bore 76 of second plurality of bores 62 such that second bore 80 of first plurality of bores 58 and second bore 82 of second plurality of bores 62 have second common central axis 84 such that second fastener (not shown) may extend through second bore 80 of first plurality of bores 58 and through second bore 82 of second plurality of bores 62. Line of securement L' extends between first common central axis 78 and second common central axis 84 extends along lap joint 16' as shown as a dashed line.

Figure 7:
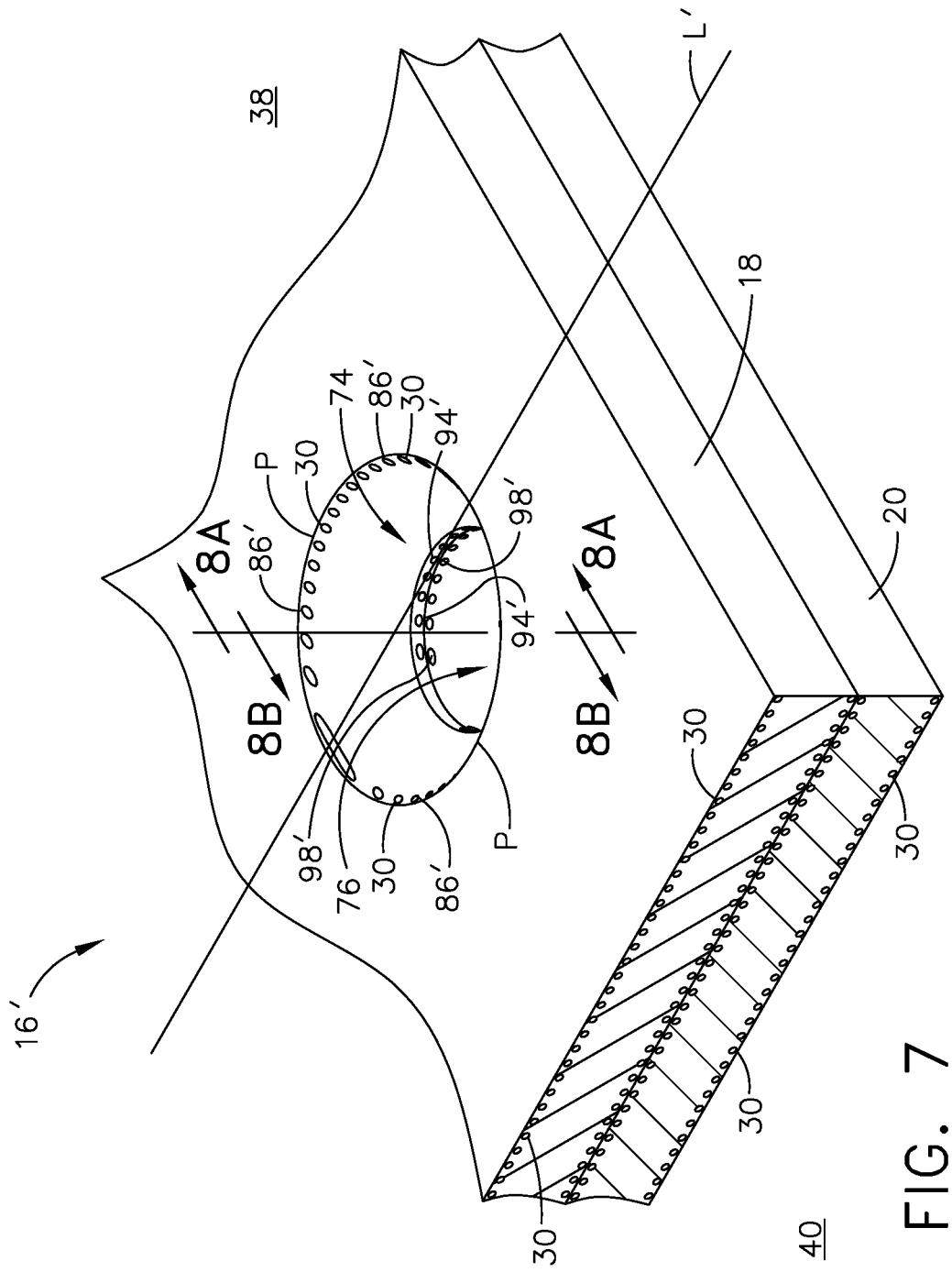
FIG. 7 is an enlarged partial perspective assembled view of what is encircled and designated as 7 in FIG. 6.

In referring to FIGS. 7, 8A and 8B first fastener or rivet 24, in this example, is positioned to extend through first bore 74 of first plurality of bores 58 and through first bore 76 of second plurality of bores 62 In FIGS. 8A and 8B. Second fastener (not shown) includes a fastener or rivet (not shown) is positioned to extend through second bore 80 of first plurality of bores 58 and through second bore 82 of second plurality of bores 62, as seen in FIG. 6. Securement of first end portion 18 and second end portion 20 is completed with securing fasteners such as rivets 24 with positioning them to extend through aligned bores in first and second end portions 18, 20.

In referring to FIG. 9, joint 16' for the metallic skin structure is shown without fasteners or rivets 24, as seen for example in FIGS. 8A and 8B, securing or coupling first end and second end portions 18, 20 together. Joint 16' includes at least one reinforcing fiber 30 which includes third plurality 86 of reinforcing fibers 30 wherein adjacent reinforcing fibers 30 within third plurality 86 of reinforcing fibers 30 extend spaced apart from one another embedded within first end portion 18 of the metallic skin structure. Third plurality 86 of reinforcing fibers 30 extend through first end portion 18 positioned closer to first surface 88 of first end portion 18 than to opposing second surface 90 of first end portion 18. First portion 92 of third plurality 86 of reinforcing fibers 30 extends between first and second adjacent bores 74, 80 as seen in FIG. 9, wherein first and second bores 74 and 80 are of first plurality of bores 58 within first end portion 18 and first portion 92 of third plurality 86 of reinforcing fibers 30 extend from first side 38 of line of securement L' to opposing second side 40 of line of securement L' as seen in FIG. 6.

In referring to FIG. 9, joint 16' includes at least one reinforcing fiber 30 which fourth plurality 94 of reinforcing fibers 30 wherein adjacent reinforcing fibers 30 within fourth plurality 94 of reinforcing fibers 30 extend spaced apart from one another embedded within first end portion 18. Fourth plurality 94 of reinforcing fibers 30 extend through first end portion 18 positioned closer to opposing second surface 90 of first end portion 18 than to first surface 88 of first end portion 18. First portion 96 of fourth plurality 94 of reinforcing fibers 30 extend between first and second adjacent bores 74, 80 as seen in FIG. 9, wherein first and second bores 74 and 80 are of first plurality of bores 58 within first end portion 18 and first portion 96 of fourth plurality 94 of reinforcing fibers 30 extends from first side 38 of line of securement L' to opposing second side 40 of line of securement L' as seen in FIG. 6.

In referring to FIG. 9, joint 16' for the metallic skin structure is shown without fasteners or rivets 24, as seen for example in FIGS. 8A and 8B, securing or coupling first end and second end portions 18, 20 together. Joint 16' includes at least one reinforcing fiber 30 which includes fifth plurality 98 of reinforcing fibers 30 wherein adjacent reinforcing fibers 30 within fifth plurality 98 of reinforcing fibers 30 extend spaced apart from one another embedded within second end portion 20 of the metallic skin structure. Fifth plurality 98 of reinforcing fibers 30 extends through second end portion 20 positioned closer to first surface 100 of second end portion 20 than to opposing second surface 102 of second end portion 20. First portion 104 of fifth plurality 98 of reinforcing fibers 30 extends between first and second adjacent bores 76, 82 as seen in FIG. 9, wherein first and second bores 76 and 82 are of second plurality of bores 62 within second end portion 20 and first portion 104 of fifth plurality 98 of reinforcing fibers 30 extends from opposing second side 40 of line of securement L' to first side 38 of line of securement L' as seen in FIG. 6.

In referring to FIG. 9, joint 16' includes at least one reinforcing fiber 30 which includes sixth plurality of reinforcing fibers 30 wherein adjacent reinforcing fibers 30 within sixth plurality 106 of reinforcing fibers 30 extend spaced apart from one another embedded within second end portion 20 of the metallic skin structure. Sixth plurality 106 of reinforcing fibers 30 extends through second end portion 20 positioned closer to opposing second surface 102 of second end portion 20 than to first surface 100 of second end portion 20. First portion 105 of sixth plurality 106 of reinforcing fibers 30 extends between first and second adjacent bores 76, 82 as seen in FIG. 9, wherein first and second bores 76 and 82 are in second plurality of bores 62 within second end portion 20 and first portion 105 of sixth plurality 106 of reinforcing fibers 30 extends from opposing second side 40 of line of securement L' to first side 38 of line of securement L' as seen in FIG. 6.

The above described configuration of reinforcing fibers 30, as seen in FIG. 9, are used in both first and second end portions 18, 20 with respect to bores positioned in first row 60, second row 64, and rows 66, 68, 70 and 72 as seen in FIG. 6.

Figure 10:
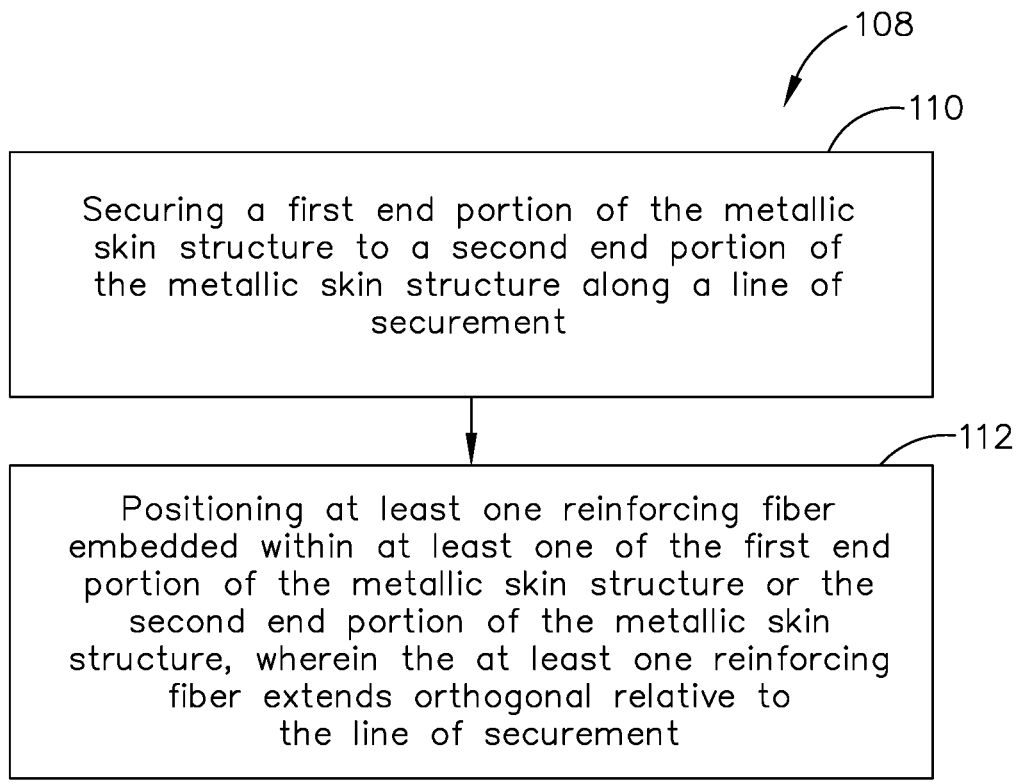
FIG. 10 is a flow chart of a method for fabricating a joint for a metallic skin structure.

In referring to FIG. 10, method 108 for fabricating a joint for a metallic skin structure includes step 110 of securing or coupling first end portion 18 of the metallic skin structure to second end portion 20 of the metallic skin structure along a line of securement L as seen in the first example of joint 16 discussed above and line of securement L' as seen in the second example of joint 16' discussed above as well. Method 108 further includes step 112 of positioning at least one reinforcing fiber 30 embedded within at least one of first end portion 18 or second end portion 20, wherein at least one reinforcing fiber 30 extends orthogonal to line of securement L in the first example and line of securement L' in the second example.

Step 110 of securing or coupling with respect to the first example of joint 16, as seen in FIGS. 4 and 5, includes positioning first end 34 of first end portion 18 and second end 36 of second end portion 20 aligned and facing each other. Step 110 of securing coupling further includes welding first end 34 and second end 36 together, wherein weld 22 defines line of securement L.

In first example of joint 16, at least one reinforcing fiber 30 which includes first plurality 42 of reinforcing fibers 30 wherein adjacent reinforcing fibers 30 within first plurality 42 of reinforcing fibers 30 extend spaced apart from one another. Step 112 of positioning further includes embedding first plurality 42 of reinforcing fibers 30 within first end portion 18 and extending first plurality of reinforcing fibers 30 through first end portion 18 positioned closer to first surface 44 of first end portion 18 than to opposing second surface 46 of first end portion 18. Step 112 of positioning further includes positioning first plurality 42 of reinforcing fibers 30 to extend from first end portion 18 into and embedded within weld 22 positioned closer to first surface 48 of weld 22 than to opposing second surface 50 of weld 22. Further, step 112 of positioning includes positioning first plurality 42 of reinforcing fibers 30 to extend from weld 22 into and embedded within second end portion 20 on an opposing second side 40 of line of securement L and embedded within second end portion 20 positioned closer to first surface 52 of second end portion 20 than to opposing second surface 54 of second end portion 20.

The at least one reinforcing fiber 30 which further includes second plurality 56 of reinforcing fibers 30 wherein adjacent reinforcing fibers 30 within second plurality 56 of reinforcing fibers 30 extend spaced apart from one another. Step 112 of positioning further includes embedding second plurality 56 of reinforcing fibers 30 within first end portion 18 on a first side 38 of line of securement L and to extend through first end portion 18 positioned closer to opposing second surface 46 of first end portion 18 than to first surface 44 of first end portion 18. Step 112 of positioning further includes positioning second plurality 56 of reinforcing fibers 30 to extend from first end portion 18 of the metallic skin structure into and embedded within weld 22 positioned closer to opposing second surface 50 of weld 22 than to first surface 48 weld 22. Further, step 112 of positioning further includes positioning second plurality 56 of reinforcing fibers 30 to extend from weld 22 into second end portion 20 on opposing second side 40 of line of securement L and embedded within second end portion 20 positioned closer to opposing second surface 54 of the metallic skin structure second end portion than to 52 first surface of second end portion 20.

Method 108 for fabricating second example of joint 16', as seen in FIGS. 6-9, includes step 112 of positioning at least one reinforcing fiber 30 includes embedding third plurality 86 of reinforcing fibers 30 into first end portion 18, wherein adjacent reinforcing fibers 30 within third plurality 86 of reinforcing fibers 30 extend spaced apart from one another and extend through first end portion 18 positioned closer to first surface 88 of first end portion 18 than to opposing second surface 90 of first end portion 18. Step 112 of positioning at least one reinforcing fiber 30 further includes embedding fourth plurality 94 of reinforcing fibers 30 into first end portion 18, wherein adjacent reinforcing fibers 30 within fourth plurality 94 of reinforcing fibers 30 extend spaced apart from one another and extend through first end portion 18 positioned closer to opposing second surface 90 of first end portion 18 than to first surface 88 of first end portion 18. Step 112 of positioning the at least one reinforcing fiber 30 further includes embedding fifth plurality 98 of reinforcing fibers 30 into second end portion 20, wherein adjacent fibers 30 within fifth plurality 98 of reinforcing fibers 30 extend spaced apart from one another and extend through second end portion 20 positioned closer to first surface 100 of second end portion 20 than to opposing second surface 102 of second end portion 20. Step 112 of positioning the at least one reinforcing fiber 30 further includes embedding sixth plurality 106 of reinforcing fibers 30 into second end portion 20, wherein adjacent reinforcing fibers 30 within sixth plurality 106 of reinforcing fibers 30 extend spaced apart from one another and extend through second end portion 20 positioned closer to opposing second surface 102 of second end portion 20 than to first surface 100 of second end portion 20. Step 110 of securing first end portion 18 to second end portion 20 includes positioning first end portion 18 and second end portion 20 in an overlying relationship with one another.

Step 110 of securing or coupling, in method 108, further includes positioning first plurality of bores 58 in first row 60 within first end portion 18 of the metallic skin structure with adjacent bores, such as first bore 74 and second bore 80 in first plurality of bores 58, as seen in FIG. 6, are spaced apart. Step 110 of securing further includes positioning second plurality of bores 62 in second row 64 within second end portion 20 of the metallic skin structure with adjacent bores, such as first bore 76 and second bore 82, in second plurality of bores 62, are spaced apart such that first row 60 of first plurality of bores 58 aligns with second row 64 of second plurality of bores 62.

Step 110 of securing or coupling further includes a step of positioning first bore 74 of first plurality of bores 58 in alignment with first bore 76 of second plurality of bores 62 such that first bore 74 of first plurality of bores 58 and first bore 76 of second plurality of bores 62 have a first common central axis 78 and positioning a first fastener, such as rivet 24, to extend through first bore 74 of first plurality of bores 58 and through first bore 76 of second plurality of bores 62. Step 110 of securing or coupling further includes a step of positioning second bore 80 adjacent to first bore 74 of first plurality of bores 58 in alignment with second bore 82 adjacent to first bore 76 of second plurality of bores 62 such that second bore 80 of first plurality of bores 58 and second bore 82 of second plurality of bores 62 have a second common central axis 84 and positioning a second fastener (not shown), such as rivet 24, to extend through second bore 80 of first plurality of bores 58 and through second bore 82 of second plurality of bores 62 and line of securement L' extends between first common central axis 78 and second common central axis 84. Line of securement L' can extend in either direction along line of securement L'. As mentioned above, the step of securing or coupling further includes the first fastener, which in this example includes rivet 24 and the second fastener (not shown) includes a rivet 24 as seen for example in FIGS. 8A and 8B.

In referring to FIGS. 6 and 9, step 110 of securing or coupling further includes positioning first bore 74 and second bore 80, of first plurality of bores 58 within first end portion 18, resulting in: first portion 92 of third plurality 86 of reinforcing fibers 30 extending within first end portion 18 between first and second adjacent bores 74, 80 of first plurality of bores 58 and extending from first side 38 of line of securement L' to the opposing second side 40 of line of securement L' and first portion 96 of fourth plurality 94 of reinforcing fibers 30 extending within first end portion 18 between first and second adjacent bores 74, 80 of first plurality of bores 58 and extending from first side 38 of line of securement L' to opposing second side 40 of line of securement L'. Step 110 of securing or coupling further includes positioning first bore 76 and the second bore 82 in second plurality of bores 62 positioned within second end portion 20, resulting in: first portion 104 of fifth plurality 98 of reinforcing fibers 30 extending within second end portion 20 between first and second adjacent bores 76, 82 in second plurality of bores 62 and extending from opposing second side 40 of line of securement L' to first side 38 of line of securement L'; and first portion 105 of sixth plurality 106 of reinforcing fibers 30 extending within second end portion 20 between first and second adjacent bores 76, 82 of second plurality of bores 62 and extending from opposing second side 40 of line of securement L' to first side 38 of line of securement L'.

Step 110 of securing or coupling further includes positioning first bore 74 of first plurality of bores 58 positioned within first end portion 18, further resulting in second portion 114 of third plurality 86 of reinforcing fibers 30 is cut into a first section 116 and second section 118. Cut second portion 114 of third plurality 86 of reinforcing fibers 30 can be seen on opposing sides of first bore 74 having termination ends 86' at perimeter P of first bore 74 in FIGS. 8A and 8B. First section 116 extends within first side 38 of line of securement L' and terminates at perimeter P of first bore 74 positioned in first side 38 of line of securement L' having termination ends 86' as seen in FIG. 8A. Second section 118 extends from perimeter P of first bore 74 positioned within opposing second side 40 of line of securement L' and extends away from first bore 74. Termination ends 86' as seen in FIG. 8B is where second section 118 of second portion 114 of third plurality 86 reinforcing fibers commence in extending away from first bore 74.

Second portion 120 of fourth plurality 94 of reinforcing fibers 30 wherein each reinforcing fiber 30 of second portion 120 of fourth plurality 94 of reinforcing fibers 30 is cut into a first section (not shown) and a second section (not shown) however underlie first section 116 and second section 118 respectively of third plurality 86 of reinforcing fibers 30. Cut fourth plurality 94 of reinforcing fibers 30 can be seen on opposing sides of first bore 74 having termination ends 94' at perimeter P of first bore 74 in FIGS. 8A and 8B. As similarly described for third plurality 86 of reinforcing fibers 30 above, the first section (not shown) extends within first side 38 of line of securement L' and terminates at perimeter P as seen as termination ends 94' in FIG. 8A of first bore 74 positioned in first side 38 of line of securement L'. The second section (not shown) extends from perimeter P of first bore 74 from termination ends 94' seen in FIG. 8B. Second section (not shown) is positioned within opposing second side 40 of line of securement L' and extends away from first bore 74.

Step 110 of securing or coupling further includes positioning first bore 76 of second plurality of bores 62 positioned within second end portion 20, further resulting in second portion 122 of fifth plurality 98 of reinforcing fibers 30 each being cut into a first section 124 and second section 126. Cut second portion 122 of fifth plurality 98 of reinforcing fibers 30 can be seen on opposing sides of first bore 76 having termination ends 98' at perimeter P of first bore 76 in FIGS. 8A and 8B. First section 124 extends within first side 38 of line of securement L' and terminates at perimeter P of first bore 76 positioned in opposing second side 40 of line of securement L' having termination ends 98' as seen in FIG. 8A. Second section 126 extends from perimeter P of first bore 76 positioned within opposing second side 40 of line of securement L' and extends away from first bore 76. Termination ends 98' as seen in FIG. 8B is where second section 126 of second portion 122 of fifth plurality 98 of reinforcing fibers 30 commence in extending away from first bore 76. Second portion 128 of sixth plurality 106 of reinforcing fibers 30 wherein each reinforcing fiber 30 of second portion 128 of sixth plurality 106 of reinforcing fibers 30 is cut into a first section (not shown) and a second section (not shown) however underlie first section 124 and second section 126 respectively of fifth plurality 98 of reinforcing fibers 30. Cut sixth plurality 106 of reinforcing fibers 30 can be seen on opposing sides of first bore 76 having termination ends 106' at perimeter P of first bore 76 in FIGS. 8A and 8B. As similarly described for fifth plurality 98 of reinforcing fibers 30 above, the first section (not shown) extends within first side 38 of line of securement L' and terminates at perimeter P as seen as termination ends 106' in FIG. 8A of first bore 76 positioned in first side 38 of line of securement L'. The second section (not shown) extends from perimeter P of first bore 76 from termination ends 106' seen in FIG. 8B. Second section (not shown) is positioned within opposing second side 40 of line of securement L' and extends away from first bore 76.

While various embodiments have been described above, this disclosure is not intended to be limited thereto. Variations can be made to the disclosed embodiments that are still within the scope of the appended claims.

What is claimed:

1. A metallic skin structure, comprising:
a first end portion;
a second end portion;
a joint between the first end portion and the second end portion, wherein the first end portion and the second end portion are coupled together along a line of securement with a weld; and
at least one reinforcing fiber, embedded within one of the first end portion or the second end portion,
wherein:
a portion of the at least one reinforcing fiber, embedded within one of the first end portion or the second end portion, is outside of the weld,
the at least one reinforcing fiber extends, embedded within the weld, across the line of securement in a direction, orthogonal to the line of securement, and
another portion of the at least one reinforcing fiber, extending from the weld and embedded within the other one of the first end portion or the second end portion, extends beyond the weld.

2. The metallic skin structure of claim 1, wherein:
a diameter of the at least one reinforcing fiber is in a range from fifty ten-thousandths of an inch (0.0050 inch) to sixty ten-thousandths of an inch (0.0060 inch);
the at least one reinforcing fiber comprises one of aramid, ceramic, or silicon carbide; and
the at least one reinforcing fiber is embedded within the at least one of the first end portion or the second end portion at a depth of at least one thousandth of an inch (0.001 inch).

3. A method for fabricating the metallic skin structure of claim 1, the method comprising steps of:
coupling the first end portion to the second end portion along the line of securement with a weld; and
positioning the at least one reinforcing fiber, embedded within one of the first end portion or the second end portion, across the line of securement in the direction, orthogonal to the line of securement,
wherein:
a portion of the at least one reinforcing fiber, embedded within one of the first end portion or the second end portion, is outside of the weld,
the at least one reinforcing fiber extends, embedded within the weld, from the one of the first end portion or the second end portion, and
another portion of the at least one reinforcing fiber, extending from the weld and embedded into the other one of the first end portion or the second end portion, extends beyond the weld.

4. The method of claim 3, wherein:
the step of coupling the first end portion to the second end portion further comprises positioning the first end portion, which comprises a first end, and the second end portion, which comprises a second end, such that the first end and the second end are aligned with each other and face each other; and
the step of coupling the first end portion to the second end portion further comprises positioning the weld between the first end of the first end portion and the second end of the second end portion, wherein the weld defines the line of securement.

5. The method of claim 4, wherein:
the at least one reinforcing fiber further comprises a first plurality of reinforcing fibers;
the first plurality of reinforcing fibers comprises adjacent reinforcing fibers, which are spaced apart from one another;
the step of positioning the at least one reinforcing fiber further comprises embedding the first plurality of reinforcing fibers within the first end portion on a first side of the line of securement such that the first plurality of reinforcing fibers extend through the first end portion;
the first plurality of reinforcing fibers is positioned closer to a first surface of the first end portion than to a second surface of the first end portion;
the step of positioning the at least one reinforcing fiber further comprises positioning the first plurality of reinforcing fibers se such that the first plurality of reinforcing fibers extends from the first end portion and is embedded within the weld; and
the first plurality of reinforcing fibers is positioned closer to a first surface of the weld than to a second surface of the weld.

6. The method of claim 5, wherein:
the step of positioning the at least one reinforcing fiber further comprises positioning the first plurality of reinforcing fibers such that the first plurality of reinforcing fibers extends from the weld and is embedded within the second end portion;
the second end portion is positioned on a second side of the line of securement and extends away from the weld; and
the first plurality of reinforcing fibers extends within the second end portion and is positioned closer to a first surface of the second end portion than to a second surface of the second end portion.

7. The method of claim 5, wherein:
the at least one reinforcing fiber further comprises a second plurality of reinforcing fibers;
the second plurality of reinforcing fibers comprises adjacent reinforcing fibers, which are spaced apart from one another;
the step of positioning the at least one reinforcing fiber further comprises embedding the second plurality of reinforcing fibers within the first end portion;
the first end portion is positioned on the first side of the line of securement;
the second plurality of reinforcing fibers extends through the first end portion;
the second plurality of reinforcing fibers is positioned closer to the second surface of the first end portion than to the first surface of the first end portion;
the step of positioning the at least one reinforcing fiber further comprises positioning the second plurality of reinforcing fibers such that the second plurality of reinforcing fibers extends from the first end portion and is embedded within the weld; and
the second plurality of reinforcing fibers is positioned closer to the second surface of the weld than to the first surface of the weld.

8. The method of claim 7, wherein:
the step of positioning the at least one reinforcing fiber further comprises positioning the second plurality of reinforcing fibers such that the second plurality of reinforcing fibers extends away from the weld and is embedded within the second end portion;
the second end portion is positioned on a second side of the line of securement; and
the second plurality of reinforcing fibers is positioned closer to the second surface of the second end portion than to the first surface of the second end portion.

9. The metallic skin structure of claim 1, wherein:
the first end portion comprises a first end;
the second end portion comprises a second end; and
the first end and the second end are aligned with each other and face each other.

10. The metallic skin structure of claim 9, wherein:
the first end and the second end are coupled together with the weld; and
the weld is positioned between the first end and the second end.

11. The metallic skin structure of claim 10, wherein:
the at least one reinforcing fiber is positioned within the first end portion on a first side of the line of securement;
the at least one reinforcing fiber extends from the first end portion and is embedded within the weld;
the at least on reinforcing fiber extends through the weld and is embedded into the second end portion; and
the second end portion is positioned on a second side of the line of securement and extends away from the weld.

12. The metallic skin structure of claim 11, wherein:
the at least one reinforcing fiber comprises a first plurality of reinforcing fibers; and
the first plurality of reinforcing fibers comprises adjacent reinforcing fibers, which are spaced apart from one another.

13. The metallic skin structure of claim 12, wherein:
the first plurality of reinforcing fibers is embedded within the first end portion; and
the first end portion is positioned on the first side of the line of securement and extends away from the weld.

14. The metallic skin structure of claim 13, wherein:
the first plurality of reinforcing fibers extends through the first end portion; and
the first plurality of reinforcing fibers is positioned closer to a first surface of the first end portion than to a second surface of the first end portion.

15. The metallic skin structure of claim 14, wherein:
the first plurality of reinforcing fibers extends from the first end portion and is embedded within the weld; and
the first plurality of reinforcing fibers extends through the weld and is positioned closer to a first surface of the weld than to a second surface of the weld.

16. The metallic skin structure of claim 15, wherein:
the first plurality of reinforcing fibers extends from the weld and is embedded within the second end portion;
the second end portion is positioned on the second side of the line of securement;
the second end portion extends away from the weld;
the first plurality of reinforcing fibers extends within the second end portion; and
the first plurality of reinforcing fibers is positioned closer to a first surface of the second end portion than to a second surface of the second end portion.

17. The metallic skin structure of claim 12, wherein:
the at least one reinforcing fiber comprises a second plurality of reinforcing fibers; and
the second plurality of reinforcing fibers comprises adjacent reinforcing fibers, which are spaced apart from one another.

18. The metallic skin structure of claim 17, wherein:
the second plurality of reinforcing fibers is embedded within the first end portion;
the first end portion is positioned on the first side of the line of securement and extends away from the weld;
the second plurality of reinforcing fibers extends through the first end portion; and
the second plurality of reinforcing fibers is positioned closer to a second surface of the first end portion than to a first surface of the first end portion.

19. The metallic skin structure of claim 18, wherein:
the second plurality of reinforcing fibers extends from the first end portion and is embedded within the weld; and
the second plurality of reinforcing fibers is positioned closer to a second surface of the weld than to a first surface of the weld.

20. The metallic skin structure of claim 19, wherein:
the second plurality of reinforcing fibers extends from the weld and is embedded within the second end portion;
the second end portion is positioned on the second side of the line of securement and the second end portion extends away from the weld;
the second plurality of reinforcing fibers extends within the second end portion; and
the second plurality of reinforcing fibers is positioned closer to the second surface of the second end portion than to the first surface of the second end portion.

* * * * *